United States Patent
Agarwal et al.

(10) Patent No.: US 10,650,433 B2
(45) Date of Patent: May 12, 2020

(54) JOINT GIFT REGISTRY

(71) Applicant: TRANSFORM SR BRANDS LLC, Hoffman Estates, IL (US)

(72) Inventors: Shubham Agarwal, Arlington Heights, IL (US); Robert C. Hudson, East Troy, WI (US); Giuseppe Mario Di Prizio, Chicago, IL (US); Abhishek Ramani, Saint Charles, IL (US); G. Mercedes De Luca, Saratoga, CA (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 1291 days.

(21) Appl. No.: 14/212,977

(22) Filed: Mar. 14, 2014

(65) Prior Publication Data

US 2014/0279207 A1    Sep. 18, 2014

Related U.S. Application Data

(60) Provisional application No. 61/788,798, filed on Mar. 15, 2013.

(51) Int. Cl.
*G06Q 30/06*    (2012.01)

(52) U.S. Cl.
CPC .............................. *G06Q 30/0633* (2013.01)

(58) Field of Classification Search
CPC ............... G06Q 50/01; G06Q 30/0633; G06Q 30/0601; G06Q 30/0269
See application file for complete search history.

(56) References Cited

U.S. PATENT DOCUMENTS

| | | | | |
|---|---|---|---|---|
| 7,756,753 B1* | 7/2010 | McFarland | ............ | G06Q 30/02 705/26.1 |
| 7,970,661 B1* | 6/2011 | Abraham | ............... | G06Q 10/10 705/14.23 |
| 2012/0150730 A1* | 6/2012 | Isaacson | ............. | G06Q 10/101 705/39 |
| 2013/0103539 A1* | 4/2013 | Abraham | ........... | G06Q 30/0633 705/26.8 |
| 2013/0117151 A1* | 5/2013 | Macaisa | ............. | G06Q 30/0633 705/26.8 |
| 2013/0191251 A1* | 7/2013 | Martin | ............... | G06Q 30/0601 705/26.61 |
| 2014/0207659 A1* | 7/2014 | Erez | .................... | G06Q 30/0633 705/39 |
| 2014/0244441 A1* | 8/2014 | Maenpaa | ........... | G06Q 30/0633 705/26.62 |
| 2014/0258055 A1* | 9/2014 | Wolfe | .................. | G06Q 20/105 705/30 |

* cited by examiner

*Primary Examiner* — Jonathan Durant
(74) *Attorney, Agent, or Firm* — McAndrews, Held & Malloy, Ltd.

(57) ABSTRACT

Various embodiments provide a system and method that enables negotiation, creation, and distributed fulfillment of joint gift registries supporting enhanced social interaction among registrants and prospective purchasers.

11 Claims, 6 Drawing Sheets

JOINT GIFT REGISTRY

CROSS-REFERENCE TO RELATED APPLICATIONS/INCORPORATION BY REFERENCE

The present application claims priority under 35 U.S.C. § 119(e) to provisional application Ser. No. 61/788,798, filed on Mar. 15, 2013. The above referenced provisional application is hereby incorporated herein by reference in its entirety.

U.S. patent application Ser. No. 13/668,256, by Macaisa et al., filed on Nov. 3, 2012, entitled "Gift Registry," is incorporated by reference herein in its entirety.

U.S. patent application Ser. No. 13/756,206, by Sridharan et al., filed on Jan. 31, 2013, entitled "Customer Assistance Platform," is incorporated by reference herein in its entirety.

U.S. patent application Ser. No. 13/494,758, by Gu et al., filed on Jun. 12, 2012, entitled "Systems and Methods for High-Precision Indoor Positioning, Navigation and Shopping Behavior Profiling," is incorporated by reference herein in its entirety.

U.S. patent application Ser. No. 13/749,355, by Agarwal et al., filed on Jan. 24, 2013, entitled "Leveraging Store Activity for Recommendations," is incorporated by reference herein in its entirety.

U.S. patent application Ser. No. 13/826,128, by Agarwal et al., filed on Mar. 14, 2013, entitled "Checkout and/or Ordering Systems and Methods," is incorporated by reference herein in its entirety.

FIELD OF THE INVENTION

Certain embodiments of the invention relate to systems and methods that support joint gift registry. More specifically, certain embodiments of the present invention relate to negotiation, creation, and distributed fulfillment of joint gift registries that include social components involving gift registry registrants and prospective gift purchasers.

BACKGROUND OF THE INVENTION

Traditional gift registries have normally been maintained as a physical, hard-copy record of the items selected by individuals celebrating a life event as something desired by the celebrants. More recently, online gift registries have enabled wider, electronic access to the information of the traditional gift registry, but have still been primarily for maintaining a list of items selected by an individual or couple as things desired as a gift during the celebration of a particular life event. In either form, negotiations between co-registrants regarding the products to add to a gift registry using existing gift registry processes is typically performed face-to-face. For example, co-registrants may browse for products to add to a gift registry together, which can be time consuming. As another example, co-registrants may split-up, add products to one or more lists, and subsequently negotiate the gift registry based on the compiled lists. However, separately browsing for products may result in sections of the retail store or retail web page being missed, problems locating co-registrants while shopping, and difficulty recalling the location of selected products for further review during subsequent negotiations, among other things. Further, product preferences revealed by co-registrants during face-to-face negotiations, such as price range, brand, color, and the like, may not be available to the retail store for providing product recommendations. Also, information related to the co-registrants, such as which of the co-registrants is more influential in making decision regarding each category of products, for example, may not be available to the retail store for providing registrant-specific recommendations.

Typically, attendees of an event are provided with a gift registry or information enabling the attendees to access the gift registry. The attendees commonly purchase products listed in the gift registry and the gift registry is updated to reflect attendee purchases. Attendees using existing gift registries may have difficulty collaborating with other attendees to identify products to purchase from the gift registry. Further, attendees using existing gift registries can have problems identifying equivalent products if a product on the gift registry is sold out, discontinued, or otherwise not available.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method that enables negotiation, creation, and distributed fulfillment of joint gift registries supporting enhanced social interaction among registrants and prospective purchasers, substantially as shown in and/or described in connection with at least one of the figures, as set forth more completely in the claims, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the present invention are related to systems and methods that support joint gift registry. More specifically, certain embodiments of the present invention relate to systems and methods that enable negotiation, creation, and distributed fulfillment of joint gift registries supporting enhanced social interaction among registrants and prospective purchasers.

An exemplary embodiment of the present invention aids gift registry registrants by providing a unified joint registry application that enables multiple registrants to track co-registrant locations in a retail store, negotiate in real-time regarding products, and jointly create a gift registry. Various embodiments aid collaboration between prospective purchasers to fulfill a gift registry. Certain embodiments aid retail stores in analyzing negotiations between gift registry registrants and/or between prospective purchasers, and providing product recommendations to registrants and/or prospective purchasers based at least in part on the negotiation analysis.

As utilized herein, the terms "exemplary" or "example" means serving as a non-limiting example, instance, or illustration. As utilized herein, the term "e.g." introduces a list of one or more non-limiting examples, instances, or illustrations.

Figure 1:
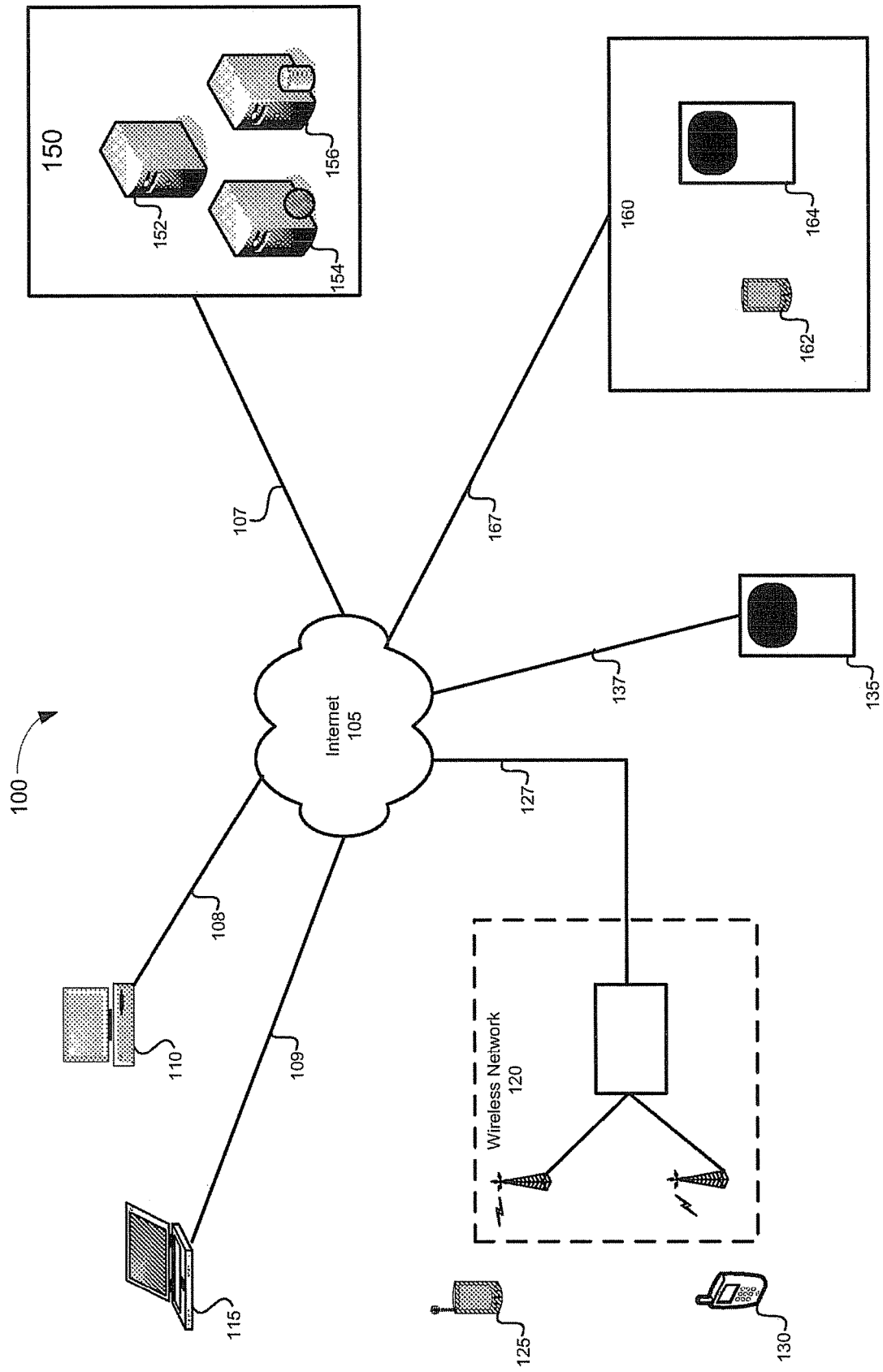
FIG. 1 is a block diagram of an exemplary system in which an example embodiment of the present invention may be practiced.

FIG. 1 is a block diagram of an exemplary system 100 in which an example embodiment of the present invention may be practiced. As illustrated in FIG. 1, the system 100 includes an e-commerce system 150 comprising one or more web servers 154, one or more database servers 156, and one or more application servers 152. The elements of the e-commerce system 150 may be interconnected, and may singly or as a group be connected to Internet 105 via communication link 107, which may employ any suitable combination of wired or wireless data communication links. FIG. 1 also includes personal computers (PCs) 110, 115, which are connected to the Internet 105 by communications links 108, 109, respectively, which may be any suitable combination of wired or wireless data communication links. PCs 110, 115 may be any of, for example, a desktop computer, a laptop computer, a notebook computer, a netbook computer, a tablet computer, or any other electronic device having capabilities suitable for accessing the Internet 105 from, for example, a home, a small business, or any private or public area having suitable support for communications links 108, 109.

In addition, FIG. 1 illustrates a user communication device 125 that may comprise, for example, a tablet computer, smart phone, or other handheld electronic device capable of communicating to the e-commerce system 150 via a wireless network 120, a communication link 127, and the Internet 105. The communication device 125 of FIG. 1 may include suitable software applications, hardware, and logic to permit the communication device to display received web pages and other forms of digital information on a display of the communication device 125, and suitable user interface elements to permit a user to interact with the e-commerce system 150 using tactual, speech, and other forms of input. The wireless network 120 may support communication of digital information using any suitable wireless access technology including, for example, any combination of short-range, long range, Wi-Fi, cellular, personal communication system (PCS), Bluetooth, Near Field communication (NFC), radio frequency identification (RFID), to name only a few possible air interface technologies.

FIG. 1 also includes a portable telephone 130 that may be capable of communicating over one or more of a cellular, PCS, Wi-Fi, or other wireless communication network, and may have more limited yet sufficient functionality to interact with the e-commerce system 150 than that available from the PCs 110, 115 and the communication device 125.

In addition, FIG. 1 illustrates a kiosk device 135, which may permit users in retail and public venues to access the e-commerce system 150. The kiosk device 135 may be designed for indoor or outdoor use, and may be linked to the e-commerce system 150 via a communication link 137 and Internet 105, as shown, or may communicate directly with the e-commerce system 150 using any other suitable wired or wireless means. The kiosk 135 may have functionality that is equivalent, greater than, or less than the personal computers 110, 115, the communications device 125, and the cellular telephone 130.

The illustration of FIG. 1 also shows a retail establishment 160 that may, for example, be a "brick-and-mortar" business associated with the operator or sponsor of the e-commerce system 150. The retail establishment 160 may include a kiosk 164 that may support access to the e-commerce system 150 from the retail establishment 160, for those users that are located within the retail establishment 160. The illustration of FIG. 1 also includes a communication device 162 that may permit a sales associate and/or a customer of the retail establishment 160 to, for example, electronically access information about products and/or services available at the retail establishment 160, at other business locations of the operator of the retail establishment 160, or at other businesses operated by, for example, the operator, or businesses that partner with the operator of the e-commerce system 150. The communication device 162 may comprise, for example, a tablet computer, smart phone, or other handheld electronic device. The communication device 162 may include suitable software applications, hardware, and logic to permit the communication device to display received web pages and other forms of digital information on a display of the communication device 125, and suitable user interface elements to permit a user to interact with the e-commerce system 150 using tactual, speech, and other forms of input. Communication devices within the retail business 160 such as, for example, the communication device 162 and the kiosk 164 may communicate with the e-commerce system 150 via the Internet 105 and the communication link 167, which may be, for example, any suitable combination of wired and/or wireless communication technologies.

In accordance with an example embodiment of the present invention, the elements of a system such as the e-commerce system 150 of FIG. 1 may include the functionality in a software application that enables user membership in a loyalty program of a business operator or sponsor of the e-commerce system 150, and the engagement of users in various events and activities. The e-commerce system 150 may include a software platform which tracks social interactions of users, and may track the activities of each member of the loyalty program. The tracking capabilities may include a flexible interaction tracking framework that supports multiple social interactions of the members. In addition, the software application may support interfacing a variety of user communication devices including, for example, tablet, desktop, notebook, notepad, and network computers, cellular telephone and smart phones, public and private kiosks, and other suitable electronic user communication devices available at the present time or in the future.

Figure 2:
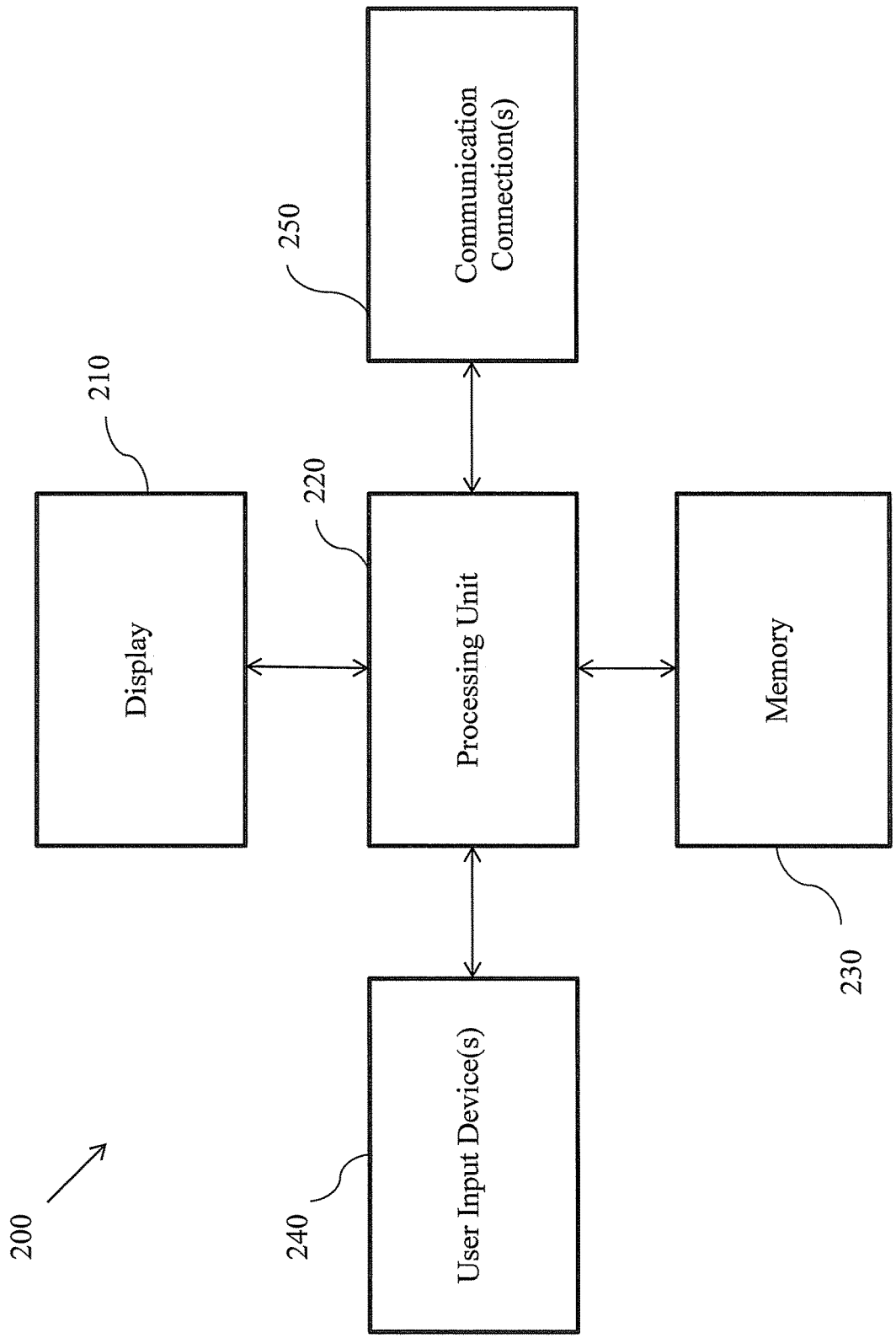
FIG. 2 is a block diagram of an exemplary computing system in which an example embodiment of the present invention may be practiced.

FIG. 2 is a block diagram of an exemplary computing system 200 in which an example embodiment of the present invention may be practiced. In various embodiments, the computing system 200 may correspond with one or more of the PCs 110, 115, user communication device 125 and/or the communication device 162, among other things, as illustrated in FIG. 1. In various embodiments, computing system 200 may be a mobile device, for example. Referring to FIG.

2, the computing system 200 includes a display 210, a processing unit 220, memory 230, user input device(s) 240, and communications connection(s) 250, among other things. Components of the computing system 200 may be implemented in software, hardware, firmware, and/or the like. The various components of the computing system 200 may be communicatively linked. Components of the computing system 200 may be implemented separately and/or integrated in various forms. For example, the display 210 and the user input device 240 may be integrated as a touchscreen display.

The display 210 may be any device capable of communicating visual information to a user. For example, a display 210 may include a liquid crystal display, a light emitting diode display, and/or any suitable display. The display 210 can be operable to display information from a software application, such as a unified gift registry application, or any suitable information. In various embodiments, the display 210 may display information provided by the processing unit 220, for example.

The processing unit 220 may be one or more central processing units, microprocessors, microcontrollers, and/or the like. The processing unit 220 may be an integrated component, or may be distributed across various locations, for example. The processing unit 220 may be capable of executing a software application, receiving input information from a user input device 240 and/or communication connection(s) 250, and generating an output displayable by a display 210, among other things. The processing unit 220 may be capable of executing any of the method(s) and/or set(s) of instructions discussed below in accordance with the present invention, for example. In certain embodiments, the processing unit 220 may communicate via communication connection(s) 250 with servers 152, 154, 156 to execute a unified gift registry application, for example.

The memory 230 may be one or more computer-readable memories, for example, such as a hard disk, floppy disk, CD, CD-ROM, DVD, compact storage, flash memory, random access memory, read-only memory, electrically erasable and programmable read-only memory and/or any suitable memory. The memory 230 may include databases, libraries, sets of information, or other storage accessed by and/or incorporated with the processing unit 220, for example. The memory 230 may be able to store data temporarily or permanently, for example. The memory 230 may be capable of storing data generated by the processing unit 220 and/or instructions readable by the processing unit 220, among other things. In various embodiments, the memory stores information related to a unified gift registry application, for example.

The user input device(s) 240 may include any device(s) capable of communicating information from a user and/or at the direction of the user to the processing unit 220 of the computing system 200, for example. The user input device(s) 240 may include button(s), a touchscreen, near field communication (NFC) readers, radio frequency identification (RFID) readers, motion tracking, orientation detection, voice recognition, a mousing device, keyboard, camera, and/or any other device capable of receiving a user directive. In certain embodiments, one or more of the user input devices 240 may be integrated into other components, such as the display 210, for example. As an example, user input device 240 may include a touchscreen display 210.

In various embodiments, the information provided by the user input device(s) 240 to the processing unit 220 may be processed by the processing unit 220 to execute a unified gift registry application, for example. As an example, button depressions, touchscreen selections, computer system orientation and/or movement detections, NFC tag information, RFID tag information, and/or voice commands, among other things, may be received from the user input device(s) 240 and processed by the processing unit 220 and/or servers 152, 154, 156 (as illustrated in FIG. 1) to trigger a unified gift registry application action or set of actions. Aspects of the present technology provide that NFC tag information, RFID tag information, and/or the like may identify a product and/or a location, among other things. For example, in a retail environment, if an NFC reader, RFID reader, or the like, of the computing system 200 is waved near a tag associated with a toaster in a retail store, the tag information may be provided to processing unit 220 and/or servers 152, 154, 156 to indicate a location of the computing device 200 and/or to identify a product of interest such that the product can be added to a joint gift registry, additional information related to the product may be displayed at computing device display 210, and/or information regarding the product can be communicated to other computing devices 200, among other things.

The communication connection(s) 250 allow communication between the computing system 200 and other external systems, such as the e-commerce system 150 of FIG. 1, for example. The communication connection(s) 250 may include wired and/or wireless connections, for example. Wireless connections may include, for example, any combination of short-range, long range, Wi-Fi, cellular, personal communication system (PCS), Bluetooth, Near Field communication (NFC), radio frequency identification (RFID), or any suitable wireless connection. In various embodiments, the information transmitted by and/or received from the communication connection(s) 250 may be processed by the processing unit 220 and/or servers 152, 154, 156 of FIG. 1, for example, to navigate a unified gift registry application. As an example, information regarding the location of the computing device 200 and/or associated computing devices, which may be obtained by geo-location or Wi-Fi triangulation information, among other things, may be received from the communication connection(s) 250 and processed by the processing unit 220 to trigger a map view displayed with computing device location identifiers on a display 210. As another example, selections of products to add to a joint gift registry can be received from user input device(s) 240 at the processing unit 220 and communicated via communication connection(s) 250 to one or more servers 152, 154, 156 of the e-commerce system 150 of FIG. 1, for example, such that the product selections may be shared with associated computing devices 200, such as computing devices of co-registrants.

Figure 3:
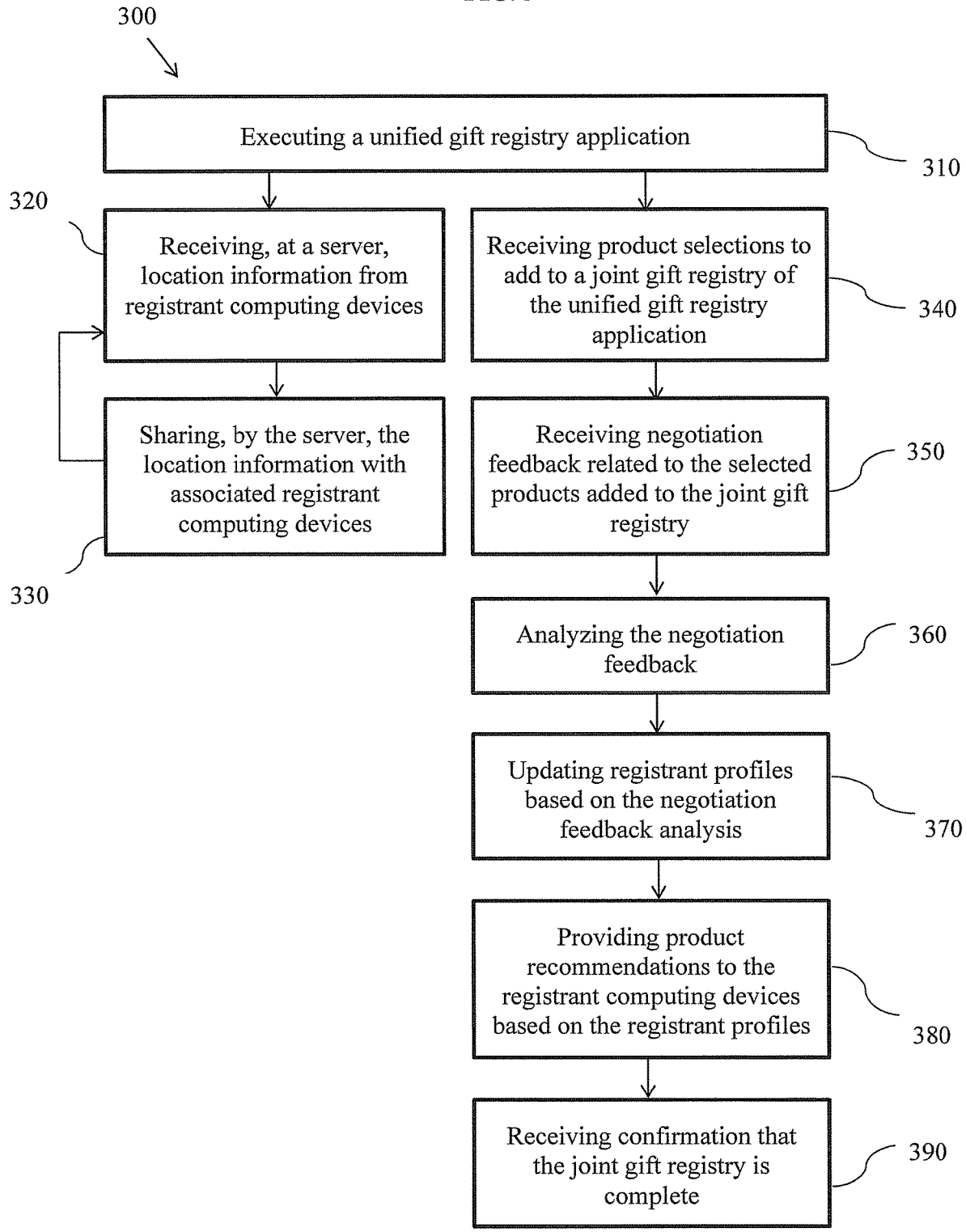
FIG. 3 is a flowchart illustrating an exemplary method for completing a joint gift registry, in accordance with an example embodiment of the present invention.

FIG. 3 is a flowchart illustrating an exemplary method for completing a joint gift registry, in accordance with an example embodiment of the present invention. The actions of the method of FIG. 3 may be performed using elements of the system 100 of FIG. 1 and/or the computing system 200 of FIG. 2 including, for example, the e-commerce system 150, the servers 152, 154, 156, the PCs 110, 115, the user communication device 125, the communication device 162, the display 210, processing unit 220, memory 230, user input device(s) 240, and/or communications connection(s) 250. The computing system 200, which can be the PCs 110, 115, user communication device 125 and/or the communication device 162 of FIG. 1, for example, may be arranged to support the execution of a unified gift registry application to negotiate and create a joint gift registry on the computing system 200 and/or servers 152, 154, 156, for example.

The method of FIG. 3 begins at block 310, where the processing unit 220 and/or one or more of servers 152, 154, 156 executes a unified gift registry application. For example, the processing unit 220 can execute a front end of the unified gift registry application and one or more of the servers 152, 154, 156 may execute a back end of the unified gift registry application. The executed software application may, for example, be displayed on the display 210 of the computing system 200.

Figure 4:
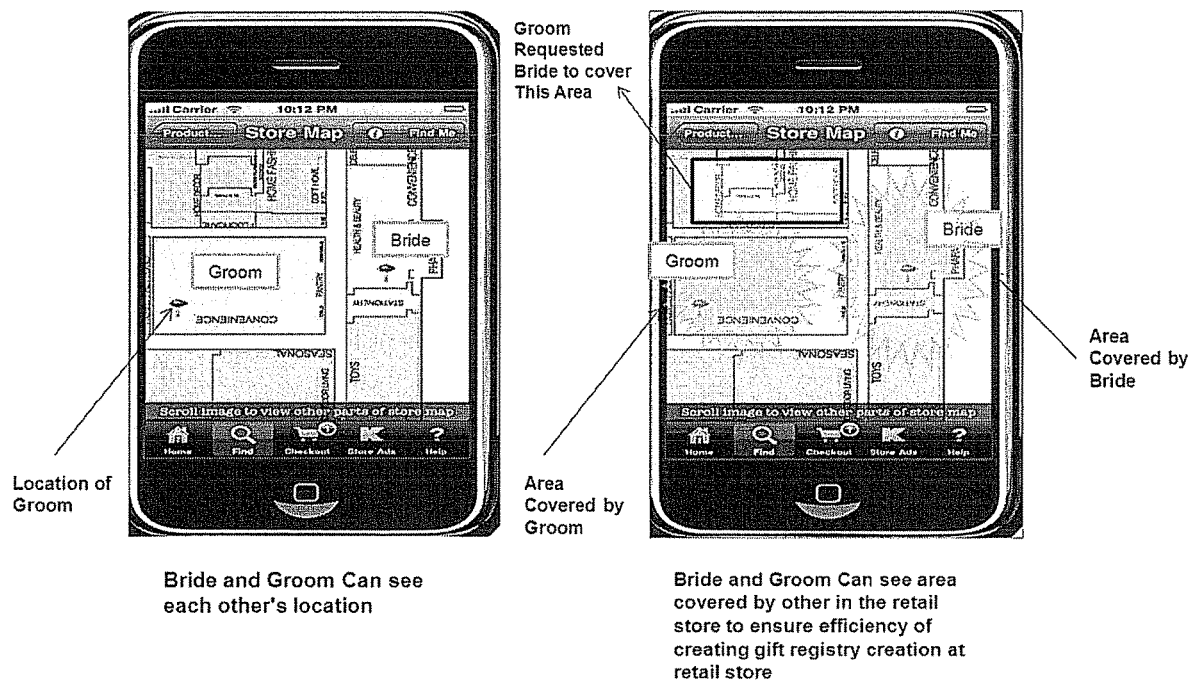
FIG. 4 is screenshots illustrating an exemplary map view of a unified gift registry application, in accordance with an example embodiment of the present invention.

At block 320, server(s) 152, 154, 156 can receive location information from registrant computing devices 200. The processing unit 220 of a registrant computing device 200 may receive a location identifier from one or more of the user input device(s) 240 and the communication connection(s) 250. The location identifier may include, for example, RFID tags, NFC tags, geo-location information, Wi-Fi triangulation information, and/or any suitable information identifying the location of the computing device 200 in a retail establishment. The location identifier can include, as another example, user selection information received at user input device(s) 240 of a registrant computing device 200. For example, a unified gift registry application can include a map view of a retail establishment that is viewable at a display 210 of the registrant computing device 200, as illustrated in FIG. 4, for example. Based on received location information, the map view may provide a map of the retail establishment, locations and/or paths of the registrant computing device 200 and any co-registrant computing devices, and locations of selected products of a joint gift registry (if any), for example. In various embodiments, the map view may include menu options, buttons, and the like enabling selection of map sections. As an example, a registrant can select a map section to request that a co-registrant review products in that section of the retail establishment. As another example, a registrant may select a map section to indicate that the registrant intends to review products in the selected map section.

Following receipt of the location information, the method of FIG. 3 may, at block 330 commence sharing, by server(s) 152, 154, 156, the location information with associated registrant computing devices 200. For example, information regarding locations of products selected by a registrant computing device, locations and/or paths of the registrant computing device 200, and/or user-selected map locations, among other things, can be shared by server(s) 152, 154, 156 with co-registrant computing devices 200 such that each co-registrant can view its location, the location of other co-registrants, the location of selected products for the joint gift registry, and/or user-selected map locations in a map view of the unified gift registry application viewable at the display 210 of each of the respective computing devices 200.

In operation, co-registrants, such as a bride and groom co-creating a joint wedding gift registry, can each be executing 310 a front end of a unified gift registry application on respective computing devices 200. A map view of the unified gift registry application may be displayed at display 210 of both the bride and groom computing devices 200. The bride and groom computing devices 200 can communicate location information via communication connection(s) 250 to server(s) 152, 154, 156, 320 executing a back end of the unified gift registry application. The location information can include information identifying current locations of the bride and groom computing devices 200, paths traveled by the bride and groom computing devices 200, products selected by the bride and groom computing devices 200 for addition to the joint wedding gift registry, and/or bride and groom selected map locations, for example. The server(s) 152, 154, 156, may communicate 330 the bride and groom location information to the bride and groom computing devices 200 such that the map view of the unified gift registry application displayed at each of the bride and groom computing devices 200 can include both the location information provided to the server(s) 152, 154, 156 by the bride computing device 200 and the groom computing device 200, for example. The map view of the unified gift registry application may be helpful in enabling a bride and groom to view each other's location. In certain embodiments, the map view of the unified gift registry application can enable a bride and groom to view the areas covered by the other in the retail store to improve efficiency and ensure that desired areas of the retail store are covered. In various embodiments, the map view of the unified gift registry application can enable the bride and groom to assign responsibility of sections of a retail store to the bride or groom.

In various embodiments, blocks 310-330 can be performed by computing devices 200 associated with one or more prospective purchasers. For example, prospective purchaser computing devices may execute a unified gift registry application at block 310 to access a gift registry created by registrant(s). The server(s) 152, 154, 156, at block 320, may receive location information from the prospective purchaser computing devices 200. The location information can include locations and/or paths of the prospective purchaser computing device 200, for example. At block 330, server(s) 152, 154, 156 can share the locations and/or paths of the prospective purchaser computing devices 200 with associated prospective purchaser computing devices 200 accessing the gift registry created by the registrant(s). The server(s) 152, 154, 156 may also share the locations of products included in the gift registry, for example. In certain embodiments, the unified gift registry application can provide the prospective purchaser computing devices 200 turn-by-turn instructions for navigating from a current computing device location to the location of one or more products on the gift registry, as discussed below in reference to FIG. 6. The turn-by-turn instructions may be provided using techniques such as those described in U.S. patent application Ser. No. 13/494,758, by Gu et al., filed on Jun. 12, 2012, entitled "Systems and Methods for High-Precision Indoor Positioning, Navigation and Shopping Behavior Profiling," which is hereby incorporated by reference herein in its entirety.

FIG. 4 is screenshots illustrating an exemplary map view of a unified gift registry application, in accordance with an example embodiment of the present invention. The screenshots of FIG. 4 may be displayed using elements of the system 100 of FIG. 1 and/or the computing system 200 of FIG. 2 including, for example, the e-commerce system 150, the servers 152, 154, 156, the PCs 110, 115, the user communication device 125, the communication device 162, the display 210, processing unit 220, memory 230, user input device(s) 240, and/or communications connection(s) 250. The computing system 200, which can be the PCs 110, 115, user communication device 125 and/or the communication device 162 of FIG. 1, for example, may be arranged to support the execution of a unified gift registry application to provide a map view of a retail establishment, for example. As illustrated in FIG. 4, a map view of a unified gift registry application can include locations of the co-registrants, areas of the retail establishment covered by the co-registrants, and/or requests for a co-registrant to cover a specified section of the retail establishment, among other things. In various embodiments, a map view of the unified gift registry application may include locations of prospective purchasers, locations of products included on a gift registry, and/or turn-by-turn instructions for navigating from a current computing device location to the location of one or more products on the gift registry, among other things.

Referring again to FIG. 3, after executing a unified gift registry application at block 310, the method of FIG. 3 may, at block 340 commence receiving product selections to add to a joint gift registry of the unified gift registry application. The products in a retail establishment or on a retail website can be selected by user input device(s) 240 of registrant computing devices 200. For example, in a retail environment, if an NFC reader, RFID reader, or the like, of the computing system 200 is waved near a tag associated with a product in a retail store, the tag information may be provided to processing unit 220 and/or servers 152, 154, 156 to identify a product of interest such that the product can be added to a joint gift registry. As another example, user input device(s) 240 can include a camera to capture a representation of a product to add to the joint gift registry. The captured representation of the product may be a product image (partial or full), a barcode or tag on the product, or an augmented reality code, for example. The processing unit 220 and/or servers 152, 154, 156 may process the captured representation of the product to determine the identity of the product to be added to the joint gift registry. In various embodiments, capturing a representation of a product and/or processing the captured representation of the product can be performed using techniques such as those described in U.S. patent application Ser. No. 13/826,128, by Agarwal et al., filed on Mar. 14, 2013, entitled "Checkout and/or Ordering Systems and Methods," which is incorporated by reference herein in its entirety.

In certain embodiments, the unified gift registry application can facilitate confirmation of the product selected by the registrant computing device 200. In various embodiments, the unified gift registry application may provide options for adding the selected product to the joint gift registry or suggesting the selected product to a co-registrant, for example. In certain embodiments, the joint gift registry may update in substantially real-time as products are selected for addition to the joint gift registry such that co-registrants can view the products added to the joint gift registry and provide negotiation feedback related to the selected products, for example. In various embodiments, the joint gift registry may be viewable in a list view, map view, or any suitable view format at the displays 210 of the registrant computing devices 200, for example.

Next, at block 350, the unified gift registry application can receive negotiation feedback related to the selected products added to the joint gift registry. For example, in response to a registrant adding a particular product to the joint gift registry, or suggesting a product to add to the joint gift registry, a co-registrant may provide negotiation feedback regarding the added or suggested product. The unified gift registry application can include buttons, menu options, selectable boxes, text messaging input boxes, voice communication links, and the like to facilitate communication between co-registrants regarding the added or suggested product. As an example, the unified gift registry application can include buttons, selectable boxes or the like for indicating whether a co-registrant likes or dislikes, for example, the added or suggested product. In various embodiments, the unified gift registry application may enable a co-registrant to suggest alternative products. For example, in response to a registrant adding a black, Kitchen Aid, two-slice toaster, a co-registrant can provide negotiation feedback indicating that the co-registrant prefers a brushed metal-finish, Black & Decker, four-slice toaster. The unified gift registry application may facilitate negotiations between the co-registrants such that a product can be selected for addition to the joint gift registry.

At block 360, the unified gift registry application can analyze the negotiation feedback exchanged between the co-registrant computing devices 200. The unified gift registry application may collect and analyze the original selected product, other suggested products, the final selected product, and information exchanged by button selections, selected menu options, selected boxes, text messages inputs, and the like to determine registrant and co-registrant preferences for brands, models, price ranges, and finishes, among other things. Further, the negotiation feedback can be analyzed to determine the influence of each co-registrant regarding different product category. For example, if a black, Kitchen Aid, two-slice toaster was initially added to the joint gift registry by a registrant, and the joint gift registry was changed to remove the two-slice toaster and add a brushed metal-finish, Black & Decker, four-slice toaster suggested by a co-registrant, the unified gift registry application may determine that the co-registrant bears more influence regarding kitchen appliance decisions. Further, the unified gift registry application can determine that the registrant is partial to Kitchen Aid products, prefers products finished in black, and can determine a preferred price range of the registrant. The unified gift registry can also determine that the co-registrant is partial to Black & Decker products, prefers products finished in brushed metal, and may determine a preferred price range of the co-registrant.

Then, at block 370, the unified gift registry application may update registrant and co-registrant profiles based on the negotiation feedback analysis performed at block 360. In various embodiments, each user of the unified gift registry application can have an associated profile that includes information regarding purchase history, product viewing history, user-provided preferences, demographic information, and any suitable information related to a customer profile. Based on the negotiation feedback analysis performed at block 360, for example, profiles for the registrant and co-registrant can be updated and/or supplemented with information related to user brand preferences, finish preferences, price ranges, preferred product categories, and the like.

At block 380, the unified gift registry application can provide product recommendations to the registrant computing devices 200 based, at least in part, on the registrant profiles. For example, the product recommendations may be provided using recommendation techniques such as those described in U.S. patent application Ser. No. 13/749,355, by Agarwal et al., filed on Jan. 24, 2013, entitled "Leveraging Store Activity for Recommendations," which is incorporated by reference herein in its entirety. The product recommendations can include products and/or accessories that may be added to a joint gift registry, for example. As an example, the unified gift registry application may recommend product accessories based on information in the registrant profiles indicating that the registrant and co-registrant have added particular products to the joint gift registry. As another example, the unified gift registry application can recommend a particular kitchen appliance based on profile information related to other kitchen appliances added to the joint registry. For example, the unified gift registry application may recommend a Black & Decker coffee maker with a brushed metal finish based on profile information of the co-registrant indicating that a brushed metal-finish, Black & Decker, four-slice toaster was previously added to the joint gift registry and the co-registrant bears more influence regarding kitchen appliance decisions. In various embodiments, the product recommendations can be displayed as a pop-up window of the unified gift registry application, in a product recommendation newsfeed of the unified gift registry application, as a message in a user inbox of the unified gift registry application, as an electronic mail message to a personal electronic mail account associated with a user profile, or any suitable mechanism for delivering product recommendations.

At block 390, the unified gift registry application can receive confirmation that the joint gift registry is complete. In certain embodiments, one or more of the registrant computing devices 200 may provide an indication to the server(s) 152, 154, 156 that the joint gift registry is complete. In various embodiments, the unified gift registry application can include a mobile device bump feature for finalizing a joint gift registry and/or for consolidating the joint gift registry. For example, NFC, Bluetooth, and/or Wi-Fi technology can be used to synchronize the joint gift registry compiled by the registrant computing devices 200.

Figure 5:
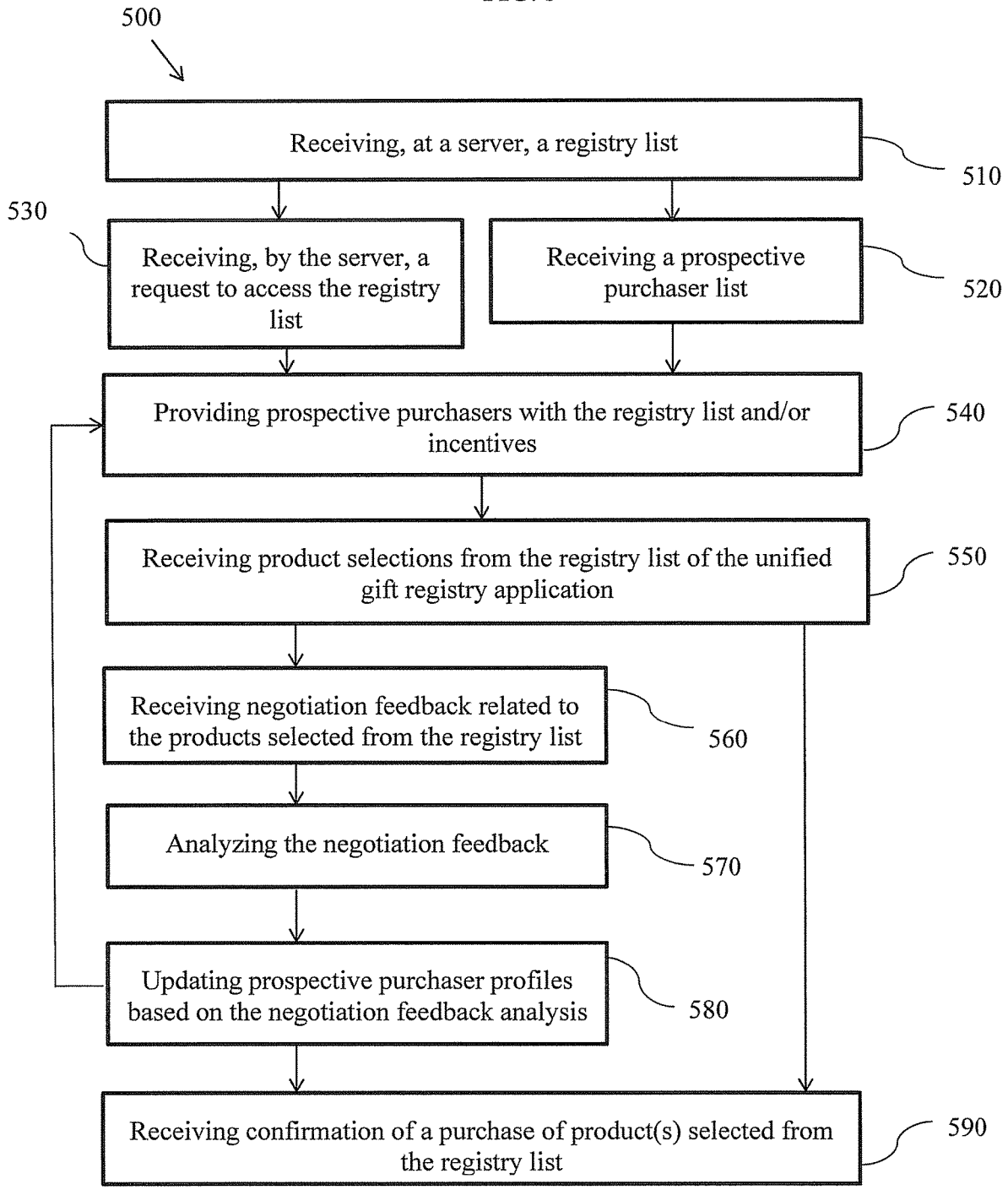
FIG. 5 is a flowchart illustrating an exemplary method for fulfilling a gift registry, in accordance with an example embodiment of the present invention.

FIG. 5 is a flowchart illustrating an exemplary method for fulfilling a gift registry, in accordance with an example embodiment of the present invention. The actions of the method of FIG. 5 may be performed using elements of the system 100 of FIG. 1 and/or the computing system 200 of FIG. 2 including, for example, the e-commerce system 150, the servers 152, 154, 156, the PCs 110, 115, the user communication device 125, the communication device 162, the display 210, processing unit 220, memory 230, user input device(s) 240, and/or communications connection(s) 250. The computing system 200, which can be the PCs 110, 115, user communication device 125 and/or the communication device 162 of FIG. 1, for example, may be arranged to support the execution of a unified gift registry application to fulfill a gift registry on the computing system 200 and/or servers 152, 154, 156, for example.

The method of FIG. 5 begins at block 510, where the one or more of servers 152, 154, 156 receives a registry list. The registry list can be a gift registry, such as the joint gift registry described above, a shopping list, or any suitable list or catalog of products, for example. The registry list may be received from registrant computing devices 200 during creation of a gift registry, for example. In certain embodiments, the registry list may be retrieved from publicly available information on the Internet, or may be uploaded to the unified gift registry application from any suitable external source, for example. At block 520, computing device 200 and/or server(s) 152, 154, 156 may receive a prospective purchaser list associated with the registry list. For example, a list of invited attendees of a baby shower can be provided by registrant(s) that created the registry list. The list of invited attendees may include contact information, such as electronic mail addresses, unified gift registry application usernames, or any suitable contact information. At block 530, server(s) 152, 154, 156 may receive a request from a computing device 200 executing the unified gift registry application for access to the registry list. As an example, attendees of a baby shower for registrant(s) may execute the unified gift registry application and request access to a registry list associated with the registrant(s).

Next, at block 540, the one or more of servers 152, 154, 156 can provide prospective purchaser computing devices 200 with the registry list and/or incentives related to products listed on the registry list. The prospective purchasers may be the prospective purchasers identified at block 520 and/or prospective purchasers that requested access to the registry list at block 530, for example. The registry list can be provided by server(s) 152, 154, 156 via the unified gift registry application, electronic mail, or any suitable mechanism for providing the registry list.

In various embodiments, the incentives related to products listed on the registry list may include personalized incentives and/or group incentives, for example. Personalized incentives can include customer specific offers and dynamic pricing inputs. Customer specific offers can include a percentage off, a dollar amount off, and complex deals such as (1) offers based on the number of units purchased; (2) offers based on the dollar amount spent; (3) buy X, get X offers, (4) buy X, get Y offers; (5) buy X and Y, get Z offers; (6) buy X, Y and Z, get A offers; and (7) buy X, Y, Z and A, get B offers, for example. Dynamic pricing inputs may include a price point, such as a specific price below the manufacturer suggested retail price, for example. Group incentives may include escalating discounts for collective purchases, for example. The group incentives can provide conditions related to, for example, the products purchased and the timeframe for purchasing the products between a group of prospective purchasers, for example.

In certain embodiments, the unified gift registry application can facilitate communications between registrant(s) and prospective purchaser(s). The unified gift registry application can provide messaging tools enabling a prospective purchaser to provide feedback regarding products listed in the registry list. For example, a prospective purchaser may message registrant(s) regarding products not on the registry list that the registrant may have interest in such as, products currently on sale, alternatives to products on the registry list, and/or accessories for products on the registry list, among other things.

In various embodiments, the unified gift registry application may provide product recommendations for equivalent products if a product on the registry list is sold out, discontinued, or otherwise not available. In certain embodiments, the unified gift registry application can provide product recommendations based on prospective purchaser profile information. For example, each user of the unified gift registry application can have an associated profile that includes information regarding purchase history, product viewing history, user-provided preferences, demographic information, and any suitable information related to a customer profile. Based on the prospective purchaser profile information and the negotiation feedback analysis discussed below in connection with block 570, for example, product recommendation can be provided related to user brand preferences, finish preferences, price ranges, preferred product categories, and the like. In certain embodiments, the product recommendations may be provided using recommendation techniques such as those described in U.S. patent application Ser. No. 13/749,355, by Agarwal et al., filed on Jan. 24, 2013, entitled "Leveraging Store Activity for Recommendations," which is incorporated by reference herein in its entirety.

Then, at block 550, the unified gift registry application may receive selections of products listed in the registry list. The products in the registry list can be selected by user input device(s) 240 of prospective purchaser computing devices 200 at a retail establishment or on a retail website. For example, in a retail environment, if an NFC reader, RFID reader, or the like, of the computing system 200 is waved near a tag associated with a product in a retail store, the tag information may be provided to processing unit 220 and/or servers 152, 154, 156 to indicate intent to purchase the selected product. As another example, user input device(s) 240 can include a camera to capture a representation of a product that a prospective purchaser intends on purchasing from the registry list. The captured representation of the product may be a product image (partial or full), a barcode or tag on the product, or an augmented reality code, for example. The processing unit 220 and/or servers 152, 154, 156 may process the captured representation of the product to determine the identity of the product to be selected from the registry list. In various embodiments, capturing a representation of a product and/or processing the captured representation of the product can be performed using techniques such as those described in U.S. patent application Ser. No. 13/826,128, by Agarwal et al., filed on Mar. 14, 2013, entitled "Checkout and/or Ordering Systems and Methods," which is incorporated by reference herein in its entirety.

In certain embodiments, the unified gift registry application can update the registry list indicating the selection of a product by a prospective purchaser computing device 200. The registry list may update in substantially real-time as products are selected for purchase from the registry list such that other prospective purchasers and registrant(s) can view the products selected from the registry list and provide negotiation feedback related to the selected products, for example. In various embodiments, the registry list may be viewable in a list view, map view, or any suitable view format at the displays 210 of the prospective purchaser computing devices 200, for example. In certain embodiments, a map view of the unified gift registry application may illustrate locations of selected and/or available products from the registry list, for example.

Next, at block 560, the unified gift registry application can receive negotiation feedback related to the products selected from the registry list. For example, in response to a prospective purchaser selecting a particular product listed on the registry list, another prospective purchaser may provide negotiation feedback regarding the selected product. The unified gift registry application can include buttons, menu options, selectable boxes, text messaging input boxes, voice communication links, and the like to facilitate communication between prospective purchasers regarding the selected product. In various embodiments, the unified gift registry application may enable prospective purchasers to suggest alternative products. For example, in response to a prospective purchaser selecting a toaster, another prospective purchaser can provide negotiation feedback suggesting that prospective purchasers collaborate to purchase a set of silverware and a kitchen knife set to take advantage of a group incentive. The unified gift registry application may facilitate negotiations between the prospective purchasers such that one or more products can be selected from the registry list.

At block 570, the unified gift registry application can analyze the negotiation feedback exchanged between the prospective purchaser computing devices 200. The unified gift registry application may collect and analyze the original selected product, other suggested products, the final selected product, and information exchanged by button selections, selected menu options, selected boxes, text messages inputs, and the like to determine prospective purchaser preferences for brands, models, price ranges, and finishes, among other things. Further, the negotiation feedback can be analyzed to determine the influence of each prospective purchaser regarding different product category. For example, if a brushed metal-finish, Black & Decker, four-slice toaster was initially selected from the registry list by a prospective purchaser, and the registry list selection was changed to remove the toaster selection and add a selection of a silverware set suggested by another prospective purchaser, the unified gift registry application may determine that the one prospective purchaser is more knowledgeable and/or appreciative of kitchen appliances and the other prospective purchaser is more knowledgeable and/or appreciative of cutlery. Further, the unified gift registry application can determine the prospective purchasers brand preferences, finish preferences, and preferred price ranges, among other things.

Then, at block 580, the unified gift registry application may update prospective purchaser profiles based on the negotiation feedback analysis performed at block 570. In various embodiments, each user of the unified gift registry application can have an associated profile that includes information regarding purchase history, product viewing history, user-provided preferences, demographic information, and any suitable information related to a customer profile. Based on the negotiation feedback analysis performed at block 570, for example, profiles for the prospective purchasers can be updated and/or supplemented with information related to user brand preferences, finish preferences, price ranges, preferred product categories, and the like. The updated and/or supplemented prospective purchaser profiles can be used at block 540 to provide product recommendations, for example.

At block 590, the unified gift registry application can receive confirmation of a purchase of one or more products selected from the registry list. The confirmation of purchase can include arranging for payment of the selected product(s) and/or pick-up or delivery of the selected product(s), for example. In various embodiments, the payment of the selected product(s) can be based on personalized and/or group incentives offered via the unified gift registry application at block 540. In certain embodiments, delivery options can include pick-up by the prospective purchaser, delivery to the prospective purchaser, delivery to the registrant(s), or any suitable delivery option, for example. In various embodiments, the unified gift registry application and/or external applications or services can enable delivery of purchased products from a group of prospective purchasers to registrant(s) when the prospective purchasers of the group each select the delivery of purchased product(s) to the registrant(s) option. In certain embodiments, the registry list can be updated to indicate purchased products. The updated registry list may include an indication of the prospective purchaser, for example.

Figure 6:
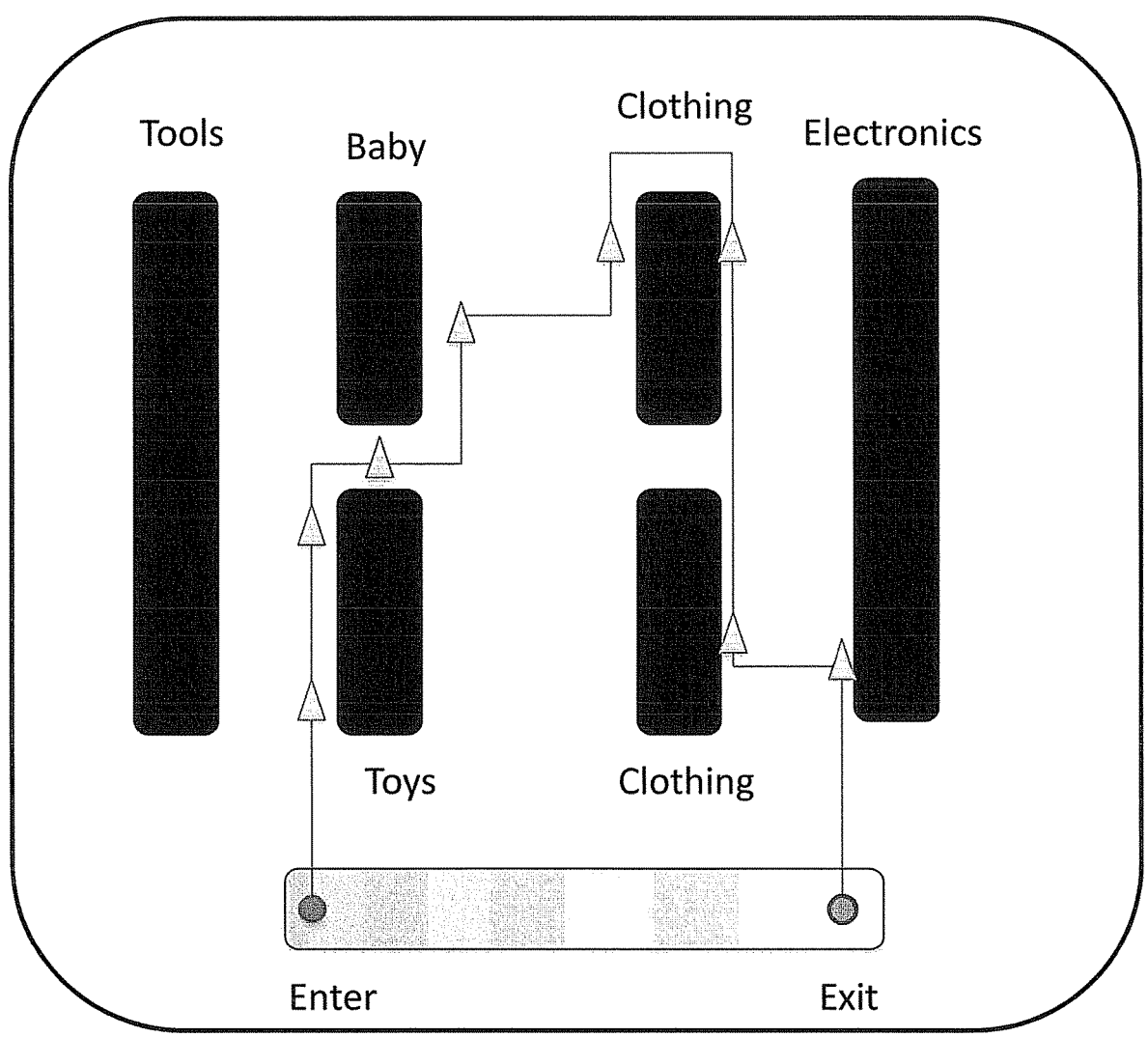
FIG. 6 is a screenshot illustrating an exemplary map view of a unified gift registry application, in accordance with an example embodiment of the present invention.

FIG. 6 is a screenshot illustrating an exemplary map view of a unified gift registry application, in accordance with an example embodiment of the present invention. The screenshot of FIG. 6 may be displayed using elements of the system 100 of FIG. 1 and/or the computing system 200 of FIG. 2 including, for example, the e-commerce system 150, the servers 152, 154, 156, the PCs 110, 115, the user communication device 125, the communication device 162, the display 210, processing unit 220, memory 230, user input device(s) 240, and/or communications connection(s) 250. The computing system 200, which can be the PCs 110, 115, user communication device 125 and/or the communication device 162 of FIG. 1, for example, may be arranged to support the execution of a unified gift registry application to provide a map view of a retail establishment with turn-by-turn instructions for navigating from a current location to one or more products on a registry list, for example. As illustrated in FIG. 6, a map view of a unified gift registry application can include product locations, a current location of a computing device 200, and/or a path for navigating from a current location of the computing device 200 to one or more products on a registry list in a retail establishment, for example. In various embodiments, the turn-by-turn instructions may be provided using techniques such as those described in U.S. patent application Ser. No. 13/494,758, by Gu et al., filed on Jun. 12, 2012, entitled "Systems and Methods for High-Precision Indoor Positioning, Navigation and Shopping Behavior Profiling," which is hereby incorporated by reference herein in its entirety.

In various embodiments, users of the unified gift registry application can include buttons, menu options, links or the like for requesting customer assistance using customer assist techniques such as those described in U.S. patent application Ser. No. 13/756,206, by Sridharan et al., filed on Jan. 31, 2013, entitled "Customer Assistance Platform," which is incorporated by reference herein in its entirety.

Various embodiments provide a method 300 for negotiating and creating a joint gift registry. In an exemplary embodiment of the present invention, the method 300, performed by one or more servers 152, 154, 156, comprises receiving 340 a product selection to add to a joint gift registry from a first registrant computing device 200. The method 300 comprises receiving 350 negotiation feedback related to the product selection from a second registrant computing device 200 and the first registrant computing device 200. The method 300 comprises analyzing 360 the negotiation feedback from the first and second registrant computing devices 200. The method 300 comprises providing 380 product recommendations to one or more of the first and second registrant computing devices 200 based at least in part on the negotiation feedback analysis.

Certain embodiments provide a method 300 for negotiating a creating a joint gift registry. In an exemplary embodiment of the present invention, the method 300, performed by one or more servers 152, 154, 156, comprises receiving 340 product selections from a plurality of mobile registrant computing devices in a retail establishment. The method 300 comprises adding 340 the product selections to a joint gift registry. The method 300 comprises providing 340 the joint gift registry with the added product selections to each of the plurality of registrant computing devices. The product selections are received, added and provided in substantially real-time.

Various embodiments provide a method 500 for distributed fulfillment of a gift registry. In an exemplary embodiment of the present invention, the method 500, performed by one or more servers 152, 154, 156, comprises receiving 510 a registry list comprising a list of products. The method 500 comprises providing 540 the registry list to prospective purchaser computing devices 200. The method 500 comprises receiving 550, from one or more of the prospective purchaser computing devices 200, a product selection from the registry list. The method 500 comprises updating 550 the registry list to indicate the product selection. The method 500 comprises receiving 560 negotiation feedback related to the product selection from one or more of the prospective purchaser computing devices 200. The method 300 comprises analyzing 570 the negotiation feedback from the one or more prospective purchaser computing devices 200. The method 300 comprises updating 580 a customer profile of the one or more prospective purchaser computing devices 200 based at least in part on the negotiation feedback analysis.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for distributed fulfillment of a gift registry, the method comprising:
    performing by at least one server communicatively coupled to a plurality of prospective purchaser computing devices over a network, at least:
        receiving a registry list comprising a list of products;
        providing the registry list to the plurality of prospective purchaser computing devices, wherein the registry list is provided to the plurality of prospective purchaser computing devices via a unified gift registry application executed by one or more of the at least one server and the plurality of prospective purchaser computing devices;
        receiving, from at least one of the plurality of prospective purchaser computing devices, a product selection from the registry list;
        updating the registry list via the unified gift registry application to indicate the product selection, wherein the product selection is dynamically viewable in substantially real-time at the plurality of prospective purchaser computing devices via the unified gift registry application;
        receiving and transmitting, via the unified gift registry application, electronic messages between at least one of the plurality of prospective purchaser computing devices and the at least one of the plurality of prospective purchaser computing devices that provided the product selection from the registry list, wherein the electronic messages comprise negotiation feedback comprising one or more of:
one or more button selections,
one or more selected menu options,
one or more selected boxes, and
one or more text message inputs,
each related to one or more of the product selection, one or more other suggested products, and a final selected product;
collecting, by the unified gift registry application, the negotiation feedback from the electronic messages received and transmitted by the at least one server between the at least one of the plurality of prospective purchaser computing devices and the at least one of the plurality of prospective purchaser computing devices that provided the product selection from the registry list;
analyzing, by the unified gift registry application, the negotiation feedback collected from the electronic messages received and transmitted by the at least one server between the at least one of the plurality of prospective purchaser computing devices and the at least one of the plurality of prospective purchaser computing devices that provided the product selection from the registry list;
updating a customer profile of the at least one of the plurality of prospective purchaser computing devices based at least in part on the negotiation feedback analysis;
providing, via the unified gift registry application, a product recommendation to at least one of the plurality of prospective purchaser computing devices based on the updated customer profile; and
facilitating, via the unified gift registry application, the purchase of the final selected product.

2. The method according to claim 1, wherein the registry list is provided to at least one of the plurality of prospective purchaser computing devices in response to a request to access the register list from the at least one of the plurality of prospective purchaser computing devices.

3. The method according to claim 1, comprising receiving a prospective purchaser list, wherein the registry list is provided to the plurality of prospective purchaser computing devices based on the prospective purchaser list.

4. The method according to claim 1, wherein the receiving the registry list comprising the list of products is retrieved from publically available information online.

5. The method according to claim 1, wherein the registry list comprises incentives related to one or more of the products listed in the registry list.

6. The method according to claim 5, wherein the incentives comprise personalized incentives for at least one of the plurality of prospective purchaser computing devices.

7. The method according to claim 5, wherein the incentives comprise group incentives for a group of the plurality of prospective purchaser computing devices participating in one or more of collective purchases and product purchases within a pre-defined timeframe.

8. The method according to claim 1, wherein the negotiation feedback comprises an alternative product selection that is different than the product selection.

9. The method according to claim 1, wherein the analyzing the negotiation feedback comprises determining an influence of the at least one of the plurality of prospective purchaser computing devices.

10. The method according to claim 1, wherein the analyzing the negotiation feedback comprises determining product preferences of the at least one of the plurality of prospective purchaser computing devices.

11. The method according to claim 10, wherein the product preferences comprise preferences for at least one of:
brands,
models,
price ranges, and
finishes.

* * * * *